United States Patent
Tanaka et al.

(10) Patent No.: US 8,670,680 B2
(45) Date of Patent: Mar. 11, 2014

(54) OPTICAL RECEIVER AND OPTICAL RECEIVING METHOD

(75) Inventors: Toshiki Tanaka, Kawasaki (JP); Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 13/324,539

(22) Filed: Dec. 13, 2011

(65) Prior Publication Data

US 2012/0155883 A1    Jun. 21, 2012

(30) Foreign Application Priority Data

Dec. 17, 2010    (JP) ................................. 2010-282300

(51) Int. Cl.
 *H04B 10/06*    (2011.01)
 *H04B 10/61*    (2013.01)

(52) U.S. Cl.
 CPC ................... *H04B 10/6161* (2013.01)
 USPC ........................................................ 398/208

(58) Field of Classification Search
 USPC ........... 398/82, 115, 155, 158, 159, 202, 203, 398/208, 209
 See application file for complete search history.

(56) References Cited

U.S. PATENT DOCUMENTS

| | | | | |
|---|---|---|---|---|
| 7,215,623 B2* | 5/2007 | Nakahira et al. | ........... | 369/59.21 |
| 7,336,729 B2* | 2/2008 | Agazzi | ........................ | 375/316 |
| 2008/0272943 A1* | 11/2008 | Tanimura et al. | ............. | 341/131 |
| 2009/0190926 A1* | 7/2009 | Charlet et al. | ................... | 398/74 |
| 2011/0236025 A1* | 9/2011 | Wagner et al. | ................ | 398/115 |
| 2012/0121274 A1* | 5/2012 | Fludger | ........................ | 398/208 |

FOREIGN PATENT DOCUMENTS

| | | | |
|---|---|---|---|
| JP | 2001-339455 A | 12/2001 |
| JP | 2002-368673 A | 12/2002 |
| JP | 2004-320377 A | 11/2004 |
| JP | 2005-159456 A | 6/2005 |

* cited by examiner

*Primary Examiner* — Dalzid Singh
(74) *Attorney, Agent, or Firm* — Fujitsu Patent Center

(57) ABSTRACT

An optical receiver includes an analog/digital converter, and a control circuit. The analog/digital converter has a dynamic range at a time of converting an analog electric signal generated based on an optical signal to a digital electric signal. The dynamic range is variable, and the control circuit varies the dynamic range of the analog/digital converter based on the chromatic dispersion of the optical signal.

9 Claims, 19 Drawing Sheets

FIG. 6

| MODULATION SCHEME | BAUD RATE [baud] | ACCUMULATED CHROMATIC DISPERSION [ps/nm] | PEAK-TO-AVERAGE-POWER RATIO [au] | ADC REQUIRED NUMBER OF BITS [bit] |
|---|---|---|---|---|
| DP-QPSK | 28G | 0 | 1.7 | 2 |
| DP-QPSK | 28G | 250 | 3.3 | 3 |
| DP-QPSK | 28G | 500 | 5 | 4 |
| ⋮ | ⋮ | ⋮ | ⋮ | ⋮ |

FIG. 10A
FIG. 10B
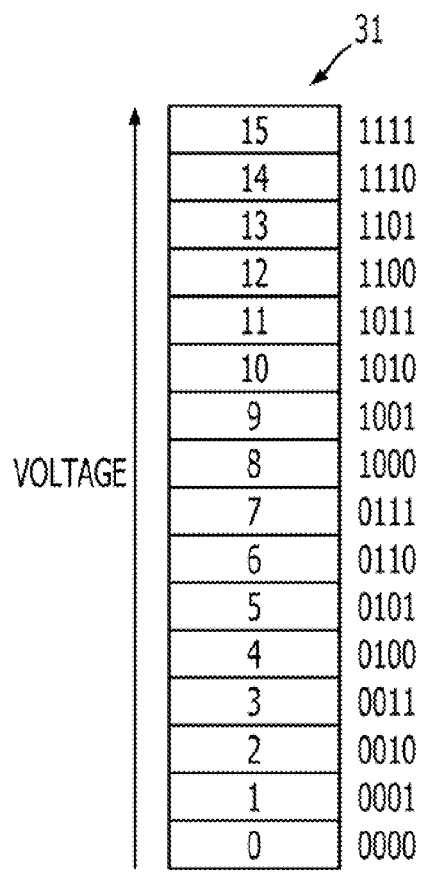
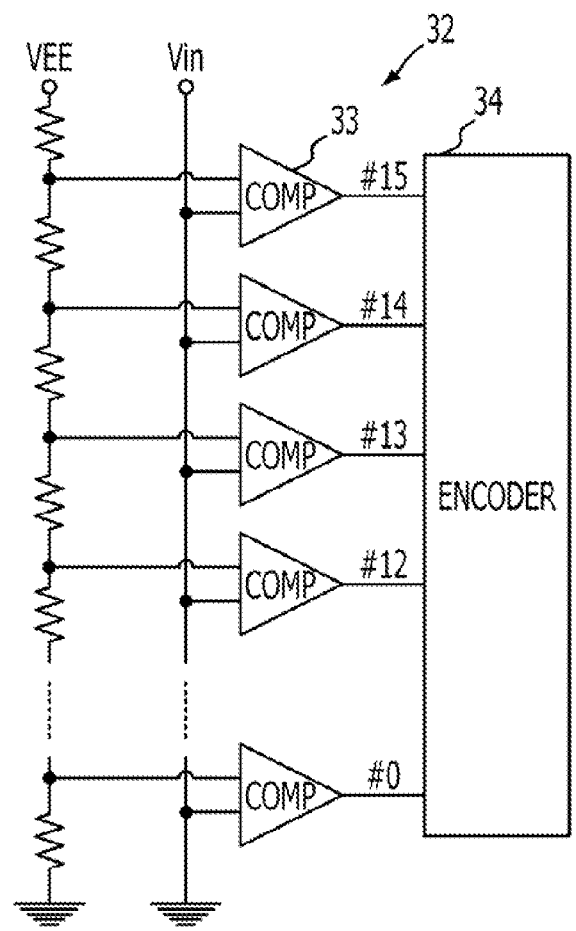

OPTICAL RECEIVER AND OPTICAL RECEIVING METHOD

CROSS-REFERENCE TO RELATED APPLICATIONS

This application is based upon and claims the benefit of priority of the prior Japanese Patent Application No. 2010-282300, filed on Dec. 17, 2010, the entire contents of which are incorporated herein by reference.

FIELD

Embodiments discussed herein relate to an optical receiver and an optical receiving method.

BACKGROUND

Recently, the growing volume of transmission traffic has led to an increasing demand for introduction of optical transmission systems having a transmission capacity of 40 Gbit/s or more. To address this demand, various modulation schemes are being studied that are excellent in spectral efficiency, optical signal noise ratio (OSNR) tolerance, and non-linearity tolerance compared to conventional non-return-to-zero (NRZ) modulation schemes. For example, a dual polarization-quadrature phase shift keying (DP-QPSK) modulation scheme is being studied. A digital coherent receiving method in which coherent receiving and digital signal processing are combined is also being studied. In addition, a dispersion monitor implemented in a digital coherent receiver of a digital coherent receiving scheme is known.

Note that there has been proposed a wireless communication device in which the resolution of an analog to digital converter (ADC) is switched on the basis of the reception level or the amount of change in the reception level. There has also been proposed a wireless communication device in which, on the basis of the level of a received signal (electric field intensity of a received signal), the valid bit range for a digital signal output from an ADC is limited and the signal is demodulated. There has also been proposed a communication device in which the resolution of an ADC is controlled on the basis of the transmission rate of data. There has also been proposed an orthogonal frequency division multiple (OFDM) access receiver in which the resolution of an ADC is switched on the basis of the carrier-to-noise (C/N) ratio of a received signal.

Examples of the related art include Japanese Unexamined Patent Application Publication No. 2002-368673, Japanese Unexamined Patent Application Publication No. 2001-339455, Japanese Unexamined Patent Application Publication No. 2005-159456, and Japanese Unexamined Patent Application Publication No. 2004-320377.

SUMMARY

According to an aspect of the invention, an optical receiver includes an analog/digital converter, and a control circuit. The analog/digital converter has a dynamic range at a time of converting an analog electric signal generated based on an optical signal to a digital electric signal. The dynamic range is variable, and the control circuit varies the dynamic range of the analog/digital converter based on the chromatic dispersion of the optical signal.

Advantages of the invention will be realized and attained via the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a table illustrating an exemplary look-up table for estimation of a peak-to-average-power ratio and determination of a required number of bits.

FIG. 10A and FIG. 10B illustrate a flash ADC.

DESCRIPTION OF EMBODIMENTS

In an optical receiver, an ADC operates at high speeds and therefore consumes a large amount of power. Accordingly, in order to achieve low power consumption for an optical receiver, it is important to reduce the power consumption of an ADC. For conventional ADCs, power consumption can be reduced by decreasing the resolution.

In an optical receiver, however, if the resolution is switched on the basis of the reception level, the amount of change in the reception level, and the transmission rate, as with ADCs for use in wireless communication devices, transmission degradation may occur. On the other hand, if transmission degradation has little effect, an excessive margin would be provided in terms of characteristics and thus a sufficient effect on reduction of power consumption cannot be achieved. In optical transmission systems, chromatic dispersion in the transmission line causes accumulation of dispersion of wavelengths of an optical signal received by an optical receiver.

Figure 1:
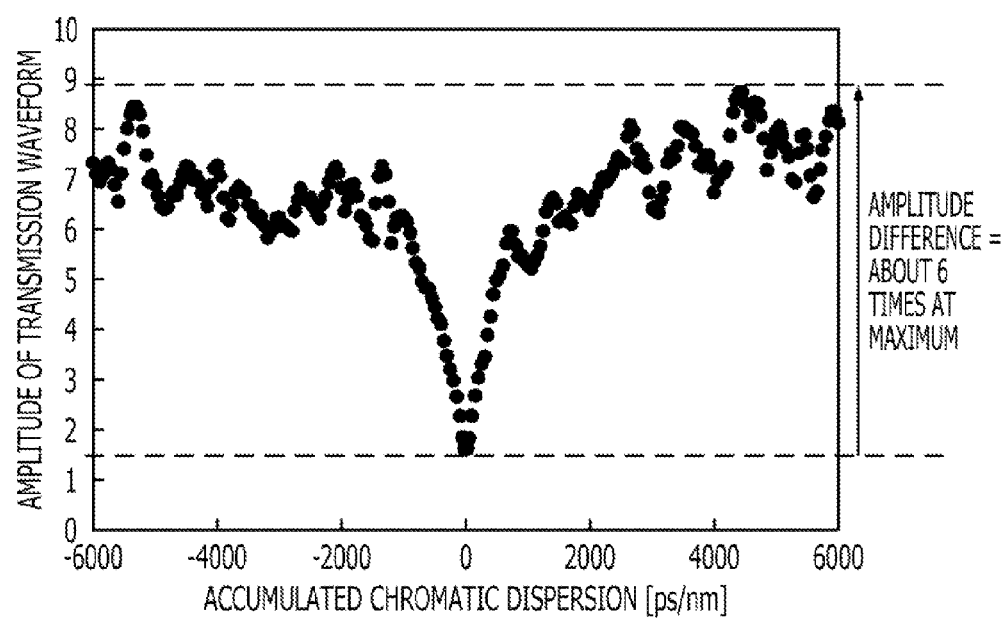
FIG. 1 is a characteristic graph illustrating an exemplary relationship between the accumulated chromatic dispersion and the amplitude of a transmission waveform in an optical transmission system.

FIG. 1 is a characteristic graph illustrating an exemplary relationship between the accumulated chromatic dispersion and the amplitude of a transmission waveform in an optical transmission system. For example, as illustrated in FIG. 1, the amplitude of a transmission waveform largely varies in accordance with the amount of chromatic dispersion (accumulated chromatic dispersion) accumulatively added to an optical signal until the optical signal is received by an optical receiver. The accumulated chromatic dispersion differs from one optical transmission system to another, and therefore the amplitude of a transmission waveform differs from one optical transmission system to another. As the amplitudes of transmission waveforms differ, the dynamic ranges required for an ADC mounted in an optical receiver applied in digital coherent receiving methods differ. Therefore, ADCs with dynamic ranges that differ from one optical transmission system to another need to be prepared.

Preparing ADCs with different dynamic ranges, however, causes an increase in the number of man-hours for development of an ADC, leading to an increase in cost. In the case in which ADCs with fixed dynamic ranges are used for various optical transmission systems that differ in accumulated chromatic dispersion, for example, the dynamic range may become excessively large for the amplitude of a transmission waveform. In such a case, the power consumption of an ADC increases with the dynamic range, and therefore there arises a problem in that wasteful amount of power is consumed in the ADC.

Example embodiments of an optical receiver and optical receiving method according to the present invention will be described in detail below with reference to the accompanying drawings. The optical receiver and optical receiving method change, on the basis of chromatic dispersion of an optical signal, the dynamic range at the time of converting to a digital electric signal an analog electric signal generated on the basis of the optical signal. In the following descriptions of embodiments, the same or similar elements are indicated by the same reference numerals and the same description is not repeated.

First Embodiment

Description of Optical Receiver

Figure 2:
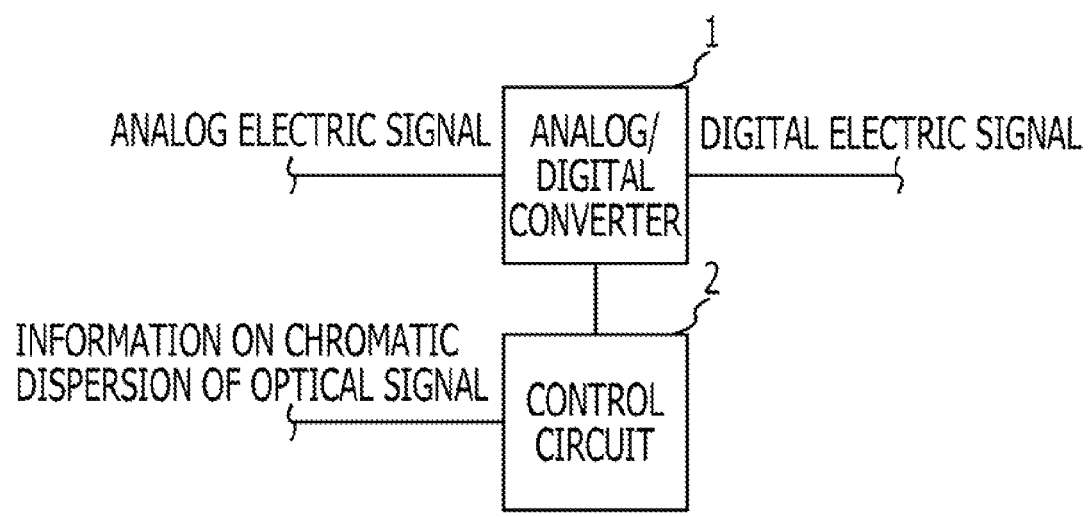
FIG. 2 is a block diagram illustrating an optical receiver according to a first embodiment.

FIG. 2 is a block diagram illustrating an optical receiver according to a first embodiment. As illustrated in FIG. 2, the optical receiver includes an analog/digital converter 1 and a control circuit 2. The optical receiver generates an analog electric signal on the basis of a received optical signal. The analog/digital converter 1 converts the generated analog electric signal to a digital electric signal. The dynamic range of the analog/digital converter 1 at the time of converting an analog electric signal to a digital electric signal is variable. For example, the dynamic range is varied or changed based on a control signal provided from the control circuit 2. The control circuit 2 varies the dynamic range of the analog/digital converter 1 on the basis of chromatic dispersion of the optical signal. For example, the control circuit 2 may be implemented by a program or the like on a processor or a field-programmable gate array (FPGA), other than a circuit. The same applies to other embodiments.

Description of Optical Receiving Method

Figure 3:
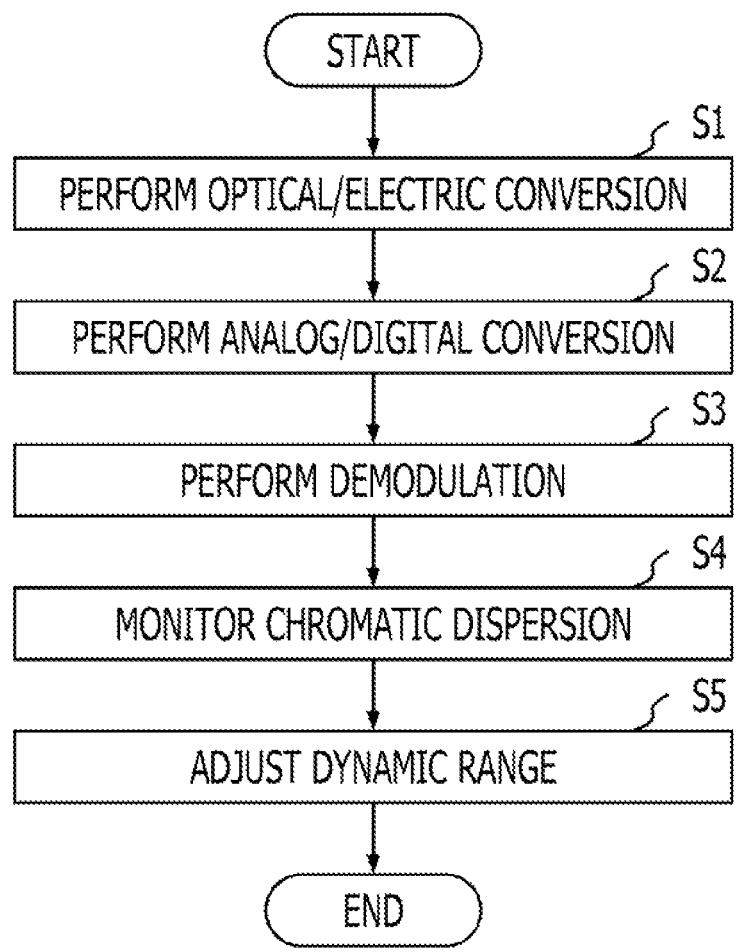
FIG. 3 is a flowchart illustrating an optical receiving method according to the first embodiment.

FIG. 3 is a flowchart illustrating the optical receiving method according to the first embodiment. As illustrated in FIG. 3, an optical receiver is activated and receives an optical signal, and the optical receiver converts the received optical signal to an analog electric signal (S1, optical/electric conversion). Subsequently, the optical receiver converts the analog electric signal to a digital electric signal using the analog/digital converter 1 (S2, analog/digital conversion). Then, the optical receiver demodulates the digital electric signal (S3). The optical receiver monitors chromatic dispersion of the demodulated signal (S4). In accordance with the monitored chromatic dispersion, the optical receiver adjusts the dynamic range at the time of analog/digital conversion in the analog/digital converter 1 (S5).

According to the first embodiment, the dynamic range of the analog/digital converter 1 is adjusted in accordance with chromatic dispersion produced when an optical signal propagates through a transmission line. Upon production of chromatic dispersion, the amplitude of an optical signal when received by the optical receiver varies depending on the degree of chromatic dispersion. If the amplitude of an optical signal received by the optical receiver varies depending on the degree of chromatic dispersion, in accordance with that variation in amplitude, the dynamic range of the analog/digital converter 1 is adjusted. For example, when the amplitude of the received optical signal is large, the dynamic range of the analog/digital converter 1 can be made large to such an extent as to be appropriate for that amplitude, whereas when the amplitude of the received optical signal is small, the dynamic range of the analog/digital converter 1 can be made small to such an extent as to be appropriate for that amplitude. The power consumption of the analog/digital converter 1 increases with the dynamic range. Therefore, the power consumption of the optical receiver can be reduced by adjusting the dynamic range of the analog/digital converter 1 in accordance with the chromatic dispersion.

Second Embodiment

Description of Optical Receiver

Figure 4:
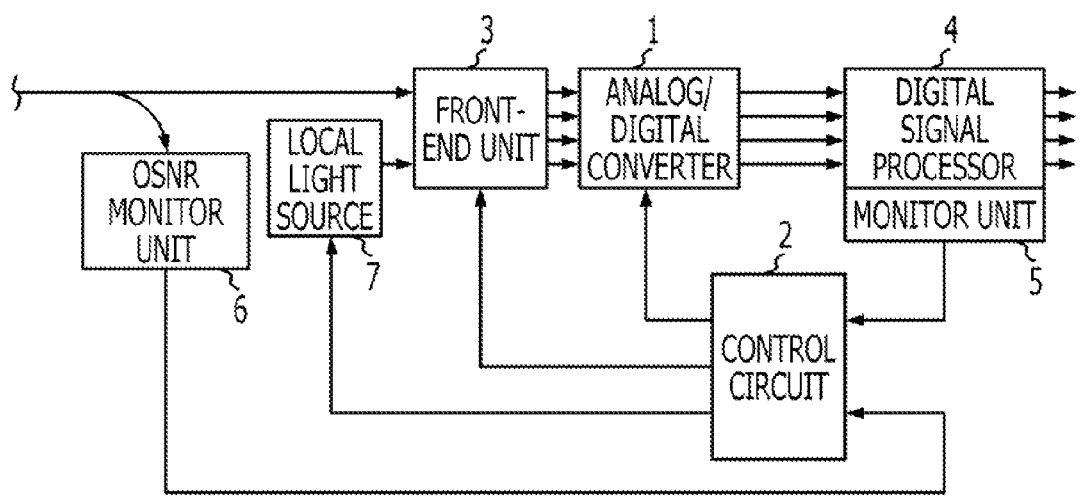
FIG. 4 is a block diagram illustrating an optical receiver according to a second embodiment.

FIG. 4 is a block diagram illustrating an optical receiver according to a second embodiment. As illustrated in FIG. 4, the optical receiver includes the analog/digital converter 1, the control circuit 2, a front-end unit 3, a digital signal processor 4, and a monitor unit 5.

The front-end unit 3 converts an optical signal received by an optical receiver to an analog electric signal. The front-end unit 3 is capable of controlling the level of an analog electric signal to be output. For example, the front-end unit 3 may include an optical attenuator, for example, so as to adjust the intensity of a received signal. The front-end unit 3 may also include a preamp such as a trans-impedance amplifier, for example, allowing the intensity of an analog electric signal after optical/electric conversion to be adjusted.

The analog/digital converter 1 is connected to the front-end unit 3. The analog/digital converter 1 converts, to a digital electric signal, each of, for example, four analog electric signals output from the front-end unit 3. That is, the analog/digital converter 1 includes an ADC. The ADC is designed to allow the dynamic range to be adjusted. The dynamic range of the ADC can be adjusted, for example, by changing the number of bits. Accordingly, the analog/digital converter 1 is designed to allow the number of bits, for example, of the ADC to be changed.

Here, the reason why four analog electric signals are output from the front-end unit 3 is that an optical transmission system including the optical receiver according to the second embodiment employs, but is not limited to, a DP-QPSK modulation scheme, for example. As such, the number of analog electric signals output from the front-end unit 3 is the number suitable for the modulation scheme employed in the optical transmission system.

Examples of a modulation scheme that can be employed in the optical transmission system include, in addition to the DP-QPSK modulation scheme, a DP-return to zero-QPSK (DP-RZ-QPSK) modulation scheme, a DP-16 quadrature amplitude modulation (QAM) scheme, and a DP-OFDM modulation scheme. Modulation schemes of single polarization (SP), instead of the modulation schemes of dual polarization (DP), may be employed. An mPSK modulation scheme in which the multiplicity of phase modulation is increased or an m amplitude shift keying (mASK) modulation scheme in which the multiplicity of intensity modulation is increased, where m is an integer, may also be employed.

The digital signal processor 4 demodulates a digital electric signal obtained by conversion performed by the analog/digital converter 1, and outputs a signal in which waveform distortion is compensated for. The monitor unit 5 monitors the transmission state of the optical signal on the basis of a signal demodulated by the digital signal processor 4. Since the transmission state is monitored, the monitor unit 5 acquires chromatic dispersion information. The monitor unit 5 may also acquire information on polarization mode dispersion, the amount of nonlinear effects, and so on. The monitor unit 5 may monitor the transmission state of an optical signal as appropriate, for example, when an optical transmission system begins operation, or during operation of the optical transmission system. The digital signal processor 4 may be implemented by a program or the like on, for example, a processor such as a digital signal processor (DSP) or a field-programmable gate array (FPGA). The same applies to other embodiments.

The control circuit 2 varies the dynamic range of the ADC of the analog/digital converter 1 in accordance with the chromatic dispersion acquired by the monitor unit 5. The control circuit 2 may change the dynamic range of the ADC of the analog/digital converter 1 in accordance with the polarization mode dispersion, the amount of nonlinear effects, and the like together with the chromatic dispersion. The dynamic range of the ADC may be set with bits at a given interval. In this case, the control circuit 2 may vary the dynamic range of the ADC by increasing or decreasing the number of bits. For example, the control circuit 2 may increase the number of bits of the ADC as the accumulated chromatic dispersion becomes large.

The dynamic range of the ADC may be set with bits. In this case, the control circuit 2 may cause, in the case where the peak value of chromatic dispersion is greater than a threshold, the bit interval in a range of the peak value of chromatic dispersion greater than the threshold to be larger than that in a range of the peak value of chromatic dispersion less than the threshold. In such a way, the number of bits of the ADC can be made the same between the range of the peak value of chromatic dispersion greater than the threshold and the range of the peak value of chromatic dispersion less than the threshold even though the dynamic range differs between the ranges. For example, in the case where the appearance rate of the range of the peak value of chromatic dispersion greater than the threshold is lower than the appearance rate of the range of the peak value of chromatic dispersion less than the threshold, the resolution of the ADC can be made high for the range of the high appearance rate and low for the range of the low appearance rate.

The control circuit 2 may adjust the level of an output signal of the front-end unit 3 or an input signal to the analog/digital converter 1 in accordance with the dynamic range of the ADC of the analog/digital converter 1. For example, the control circuit 2 may adjust the level of an output signal of the front-end unit 3 or an input signal to the analog/digital converter 1 by controlling the optical attenuator or the preamp of the front-end unit 3.

The optical receiver may further include an optical-signal-to-noise ratio (OSNR) monitor unit 6 and a local light source 7. In the case where the optical receiver includes the local light source 7, the front-end unit 3 mixes an optical signal received by the optical receiver with local light output from the local light source 7 to restore the original signal and converts the original signal to an analog electric signal. The control circuit 2 may control the local light level in accordance with the dynamic range of the ADC of the analog/digital converter 1.

In the case where the optical receiver includes the OSNR monitor unit 6, the OSNR monitor unit 6 branches, by using a coupler or the like, and monitors an optical signal received by the optical receiver and transmits its OSNR value to the control circuit 2. The control circuit 2 may control the analog/digital converter 1, the front-end unit 3, and the local light source 7 on the basis of monitor information on a transmission state obtained from the monitor unit 5 and the OSNR value from the OSNR monitor unit 6.

According to the second embodiment, the same effect as in the first embodiment may be obtained.

Third Embodiment

Description of Optical Receiver

Figure 5:
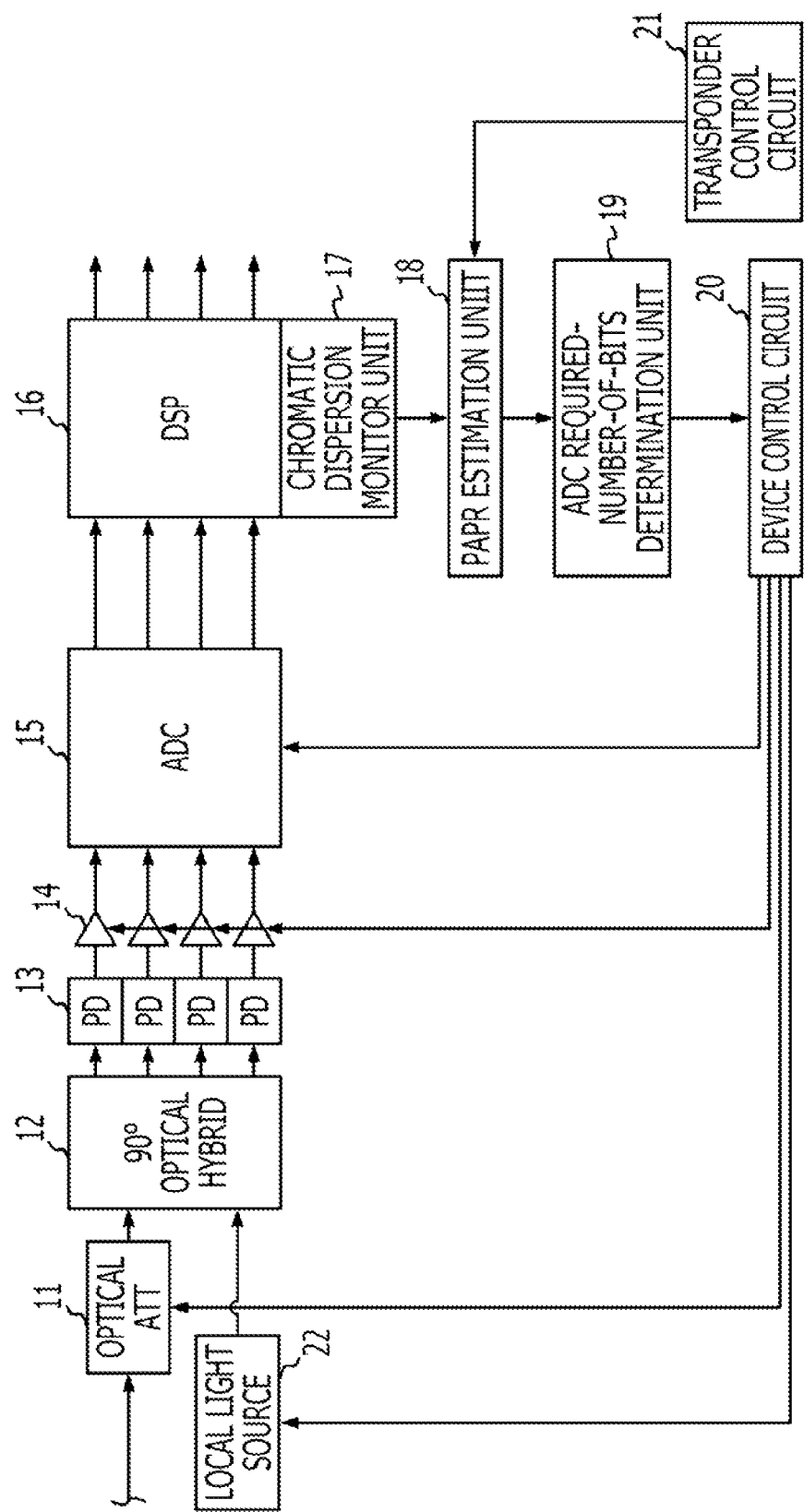
FIG. 5 is a block diagram illustrating an optical receiver according to a third embodiment.

FIG. 5 is a block diagram illustrating an optical receiver according to a third embodiment. As illustrated in FIG. 5, the optical receiver includes as a front-end unit, for example, an optical attenuator (ATT) 11, a 90° optical hybrid 12, for example, four photodiodes (PD) 13, and, for example, four electric amplifiers 14. The four photodiodes 13 may be two pairs of balanced PDs.

The optical attenuator 11 adjusts the power of an optical signal received by the optical receiver. The 90° optical hybrid 12 is connected to the optical attenuator 11 and a local light source 22. The local light source 22 outputs local light whose optical power is appropriately controlled. The 90° optical hybrid 12 mixes output light (signals of two polarized waves that are orthogonal to each other) of the optical attenuator 11 with local light and outputs a signal of the quadrature component I, Q for a signal of each polarized wave.

Each photodiode 13 is connected to a port of the 90° optical hybrid 12. A signal of the quadrature component I, Q for a signal of each polarized wave is output from the port. Each photodiode 13 performs optical/electric conversion. The electric amplifiers 14 are connected to the respective photodiodes 13. Each electric amplifier 14 amplifies an analog electric signal output from the corresponding photodiode 13 to adjust the amplitude of the analog electric signal to a constant value such that the level of the analog electric signal is within a specified range of an ADC 15.

The optical receiver includes, for example, the ADC 15 as an analog/digital converter. The ADC 15 is connected to the electric amplifiers 14. The ADC 15 converts analog electric signals output from the electric amplifiers 14 to digital electric signals. As the ADC 15, a flash ADC or a successive approximation ADC, for example, may be used. A flash ADC and a successive approximation ADC will be described later.

The optical receiver also includes a digital signal processor (DSP) 16, for example, as a digital signal processor. The DSP 16 is connected to the ADC 15. The DSP 16 performs various kinds of processing, such as waveform distortion compensation processing, of digital electric signals output from the ADC 15.

The optical receiver also includes a chromatic dispersion monitor unit 17, for example, as a monitor unit. The chromatic dispersion monitor unit 17 may be implemented as part of the DSP 16, for example. The chromatic dispersion monitor unit 17 calculates accumulated chromatic dispersion on the basis of information that has been extracted when waveform distortion compensation processing is performed in the DSP 16.

The optical receiver control circuit also includes a peak-to-average-power ratio (PAPR) estimation unit 18, an ADC required-number-of-bits determination unit 19, and a device control circuit 20, for example. The PAPR estimation unit 18 may be implemented in such a way that a processor executes a program for calculating a peak-to-average-power ratio. The peak-to-average-power ratio represents the relative value of a peak with respect to a constant value of average power.

The PAPR estimation unit 18 estimates a peak-to-average-power ratio on the basis of information on accumulated chromatic dispersion transmitted from the chromatic dispersion monitor unit 17. The PAPR estimation unit 18, when estimating a peak-to-average-power ratio, may acquire information on the current modulation scheme and baud rate, for example, from a transponder control circuit 21 of the optical receiver. Then, the PAPR estimation unit 18 may estimate a peak-to-average-power ratio on the basis of the information on the modulation scheme and baud rate and a function for estimation of a peak-to-average-power ratio or a look-up table.

The ADC required-number-of-bits determination unit 19 may be implemented in such a way that a processor executes a program for determining the required number of bits of the ADC 15. The ADC required-number-of-bits determination unit 19 determines the required number of bits of the ADC 15 on the basis of information on a peak-to-average-power ratio transmitted from the PAPR estimation unit 18. The ADC required-number-of-bits determination unit 19 may determine the required number of bits of the ADC 15 on the basis of the information on a peak-to-average-power ratio and a function for determining the required number of bits of the ADC 15 or a look-up table.

FIG. 6 is a table illustrating an exemplary look-up table for estimation of a peak-to-average-power ratio and determination of a required number of bits. Referring to a look-up table 26 illustrated in FIG. 6, the PAPR estimation unit 18 can estimate a peak-to-average-power ratio on the basis of the modulation scheme and baud rate and the accumulated chromatic dispersion, for example. Referring to the look-up table 26 illustrated in FIG. 6, the ADC required-number-of-bits determination unit 19 can determine the required number of bits of the ADC 15 on the basis of the modulation scheme and baud rate and the accumulated chromatic dispersion, for example. Note that while FIG. 6 illustrates the case where the modulation scheme is a DP-QPSK and the baud rate is 28 Gbaud, the look-up table 26 may include other modulation schemes and baud rates as well.

The PAPR estimation unit 18 may use a function for estimation of a peak-to-average-power ratio, instead of the look-up table 26. The ADC required-number-of-bits determination unit 19 may use a function for determination of the required number of bits of the ADC 15, instead of the look-up table 26.

Figure 7:
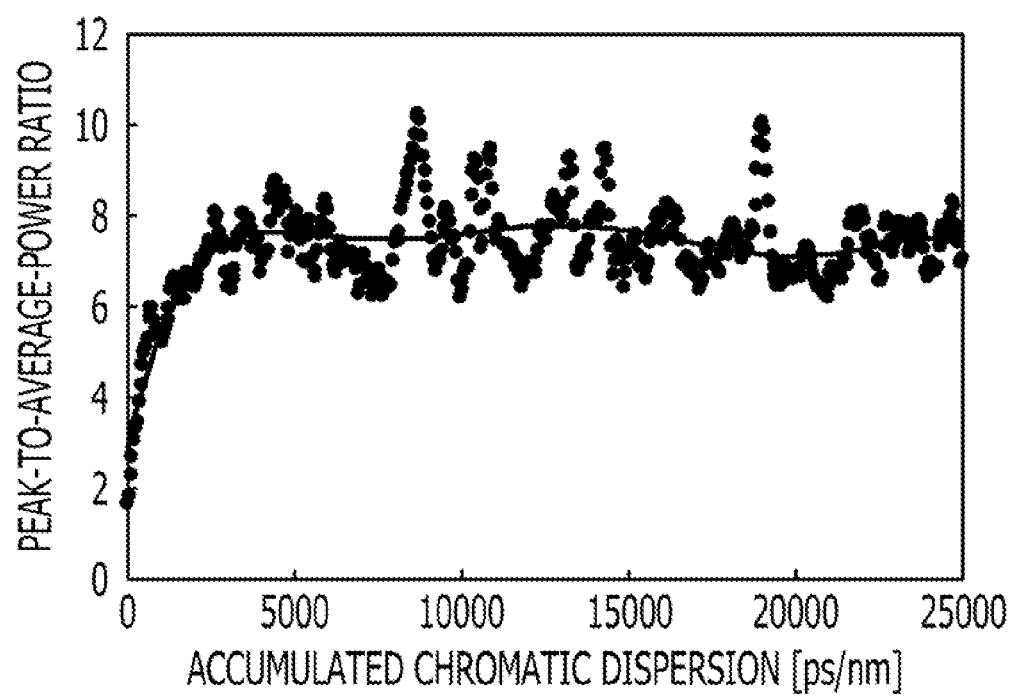
FIG. 7 is a characteristic graph illustrating an exemplary relationship between the accumulated chromatic dispersion and the peak-to-average-power ratio.

FIG. 7 is a characteristic graph illustrating an exemplary relationship between the accumulated chromatic dispersion and the peak-to-average-power ratio. In the characteristic graph illustrated in FIG. 7, each plot represents an actual measurement value or a simulation value. In the characteristic graph illustrated in FIG. 7, a function for estimation of a peak-to-average-power ratio is represented by a curve that approximates a group of plots. The approximation expression of the approximation curve is given below formula (I), where x is accumulated chromatic dispersion and y is a peak-to-average-power ratio. With this approximation expression, a peak-to-average-power ratio can be determined from accumulated chromatic dispersion.

$$y = -2.6716 \times 10^{-24} x^6 + 2.2098 \times 10^{-19} x^5 - 7.0794 \times 10^{-15} x^4 + \\ 1.1080 \times 10^{-10} x^3 - 8.8107 \times 10^{-7} x^2 + 3.3402 \times 10^{-3} x + 2.8811 \quad (1)$$

Figure 8:
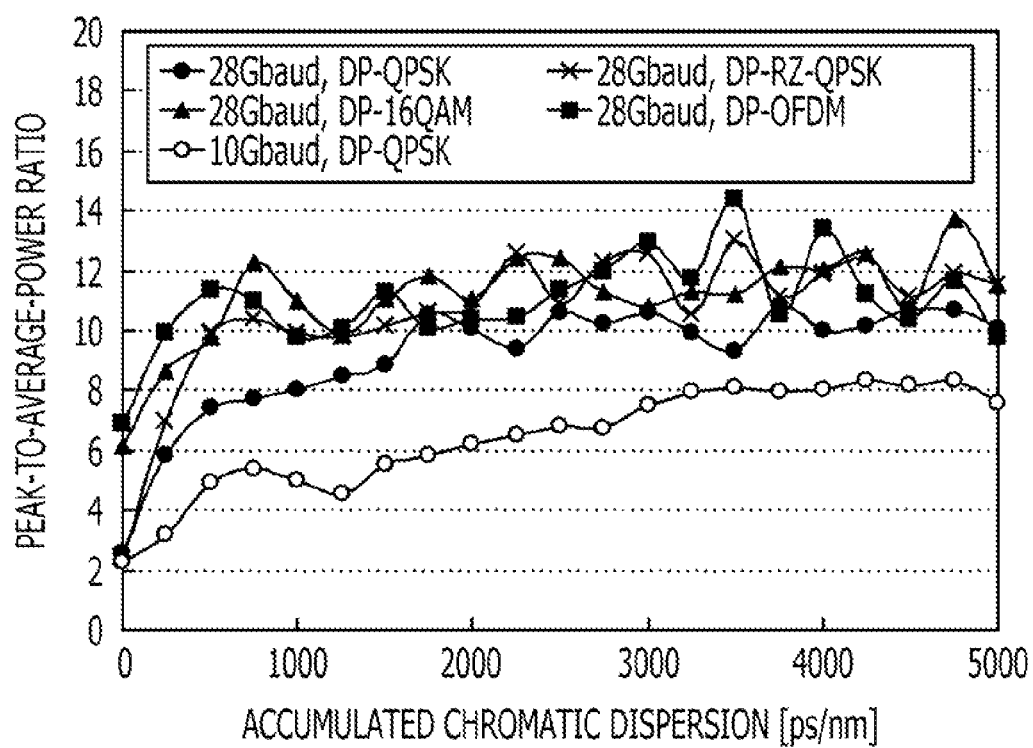
FIG. 8 is a characteristic graph illustrating exemplary relationships between the accumulated chromatic dispersion and the peak-to-average-power ratio.

FIG. 8 is a characteristic graph illustrating exemplary relationships between the accumulated chromatic dispersion and the peak-to-average-power ratio for various modulation schemes and baud rates. The distribution states of groups of plots and the shapes of approximation curves illustrated in FIG. 7 may differ depending on modulation schemes and baud rates. Accordingly, as illustrated in FIG. 8, a characteristic graph similar to that of FIG. 7 may be prepared in accordance with combinations of modulation schemes and baud rates. The approximation expression of a curve that approximates a group of plots may be determined for each combination of a modulation scheme and a baud rate.

Figure 9:
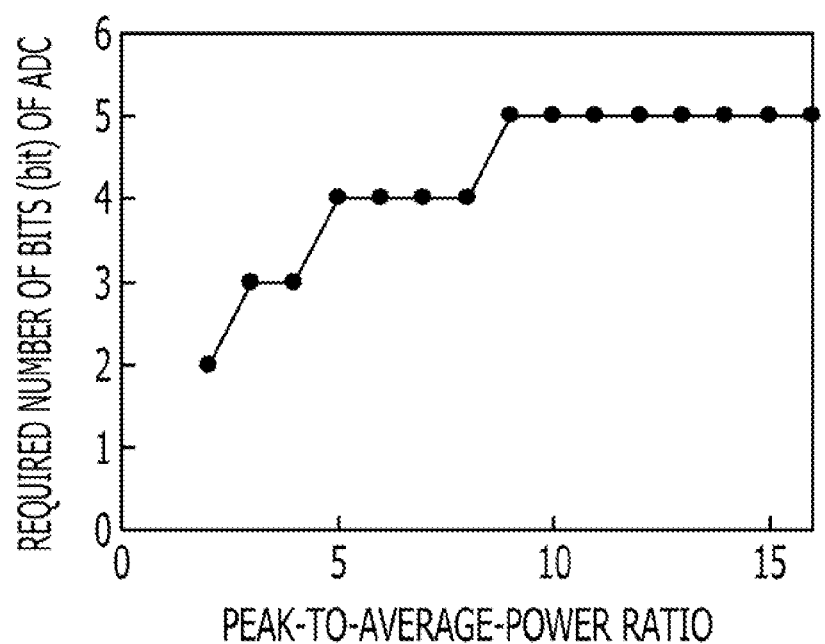
FIG. 9 is a characteristic graph illustrating an exemplary relationship between the peak-to-average-power ratio and the required number of bits.

FIG. 9 is a characteristic graph illustrating an exemplary relationship between the peak-to-average-power ratio and the required number of bits. The required number of bits of the ADC 15 for the peak-to-average-power ratio obtained from the foregoing function for estimation of the peak-to-average-power ratio can be determined on the basis of the characteristic graph illustrated in FIG. 9.

As illustrated in FIG. 5, the device control circuit 20 controls the number of bits of the ADC 15 on the basis of information on the required number of bits of the ADC 15 transmitted from the ADC required-number-of-bits determination unit 19. The device control circuit 20 may control the output level of the electric amplifier 14 in accordance with the number of bits of the ADC 15 such that the amplitude of an output signal of the electric amplifier 14 is within the dynamic range of the ADC 15. By using, as the electric amplifier 14, an electric amplifier whose relationship between the control voltage for the electric amplifier and the output amplitude is known, for example, the output level of the electric amplifier 14 can be controlled in accordance with a control voltage provided from the device control circuit 20.

Also, the device control circuit 20 may adjust the amount of losses of the optical attenuator 11 and the output light power of the local light source 22. This adjustment can inhibit and/or prevent the electric amplifier 14 from operating in a nonlinear region, and thus can reduce degradation in characteristic in the electric amplifier 14.

Description of Flash ADC

FIG. 10A and FIG. 10B illustrate a flash ADC. Here, the case where the digital value of an output signal is 4 bits will be described as an example. FIG. 10A illustrates the relationship between the analog input voltage and the digital output value of the flash ADC. FIG. 10B illustrates an equivalent circuit of the flash ADC. Numerical values of 0 to 15 of a schematic illustration 31 of FIG. 10A correspond to the numerical values of a COMP amplifier 33 designated by #0 to #15 of the circuit diagram 32 of FIG. 10B, respectively.

Upon application of an analog input voltage to an input terminal Vin, each of COMP amplifiers 33 of #0 to #15 compares the input voltage with a reference voltage, and, as a result, outputs a comparison signal. As the reference voltage of each COMP amplifier 33, a voltage obtained by resistance division of a power supply voltage VEE can be used. An encoder 34 recognizes the level of output on the basis of comparison signals from the COMP amplifiers 33. For example, in the case where the input voltage is optimum for the reference voltage in the COMP amplifier 33 of #12, the output of the COMP amplifier 33 of #12 is "1" and the outputs of other COMP amplifiers 33 are "0". On the basis of output values of the COMP amplifiers 33 of #0 to #15, the encoder 34 outputs "1100" as illustrated in the schematic illustration 31 of FIG. 10A. In this way, the voltage of an analog electric signal at some instant is converted to a digital electric signal.

In the flash ADC illustrated in FIG. 10B, the number of bits is decreased as follows. For example, in the case where the number of bits is decreased from 4 (16 levels) to 3 (8 levels), the analog input voltage to the input terminal Vin, for example, is reduced to half that in the case where the number of bits is 4. The driving voltages of eight COMP amplifiers 33 of #8 to #15 are turned off. Information of "0" representing no output is provided to ports of the encoder 34 to which comparison signals are input from the COMP amplifiers 33 of #8 to #15. The same applies to the case where the number of bits is decreased from 3 (8 levels) to 2 (4 levels) and the case where the number of bits is decreased from 2 (4 levels) to 1 (2 levels).

Note that, by adjusting the offset of an analog input voltage to the input terminal Vin, the COMP amplifiers 33 of #0 to #7 may be turned off or the COMP amplifiers 33 of #4 to #11 may be turned off.

Description of Successive Approximation ADC

Figure 11B:
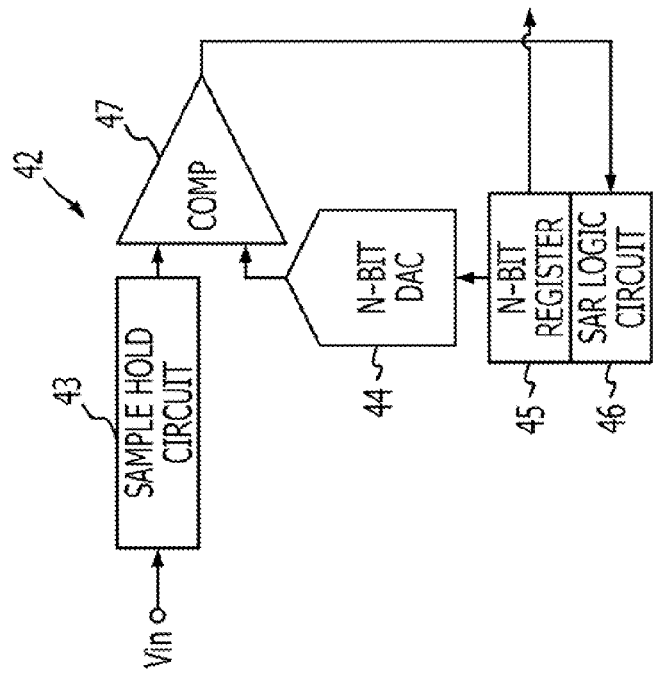
FIG. 11A and FIG. 11B illustrate a successive approximation ADC.
Figure 11A:
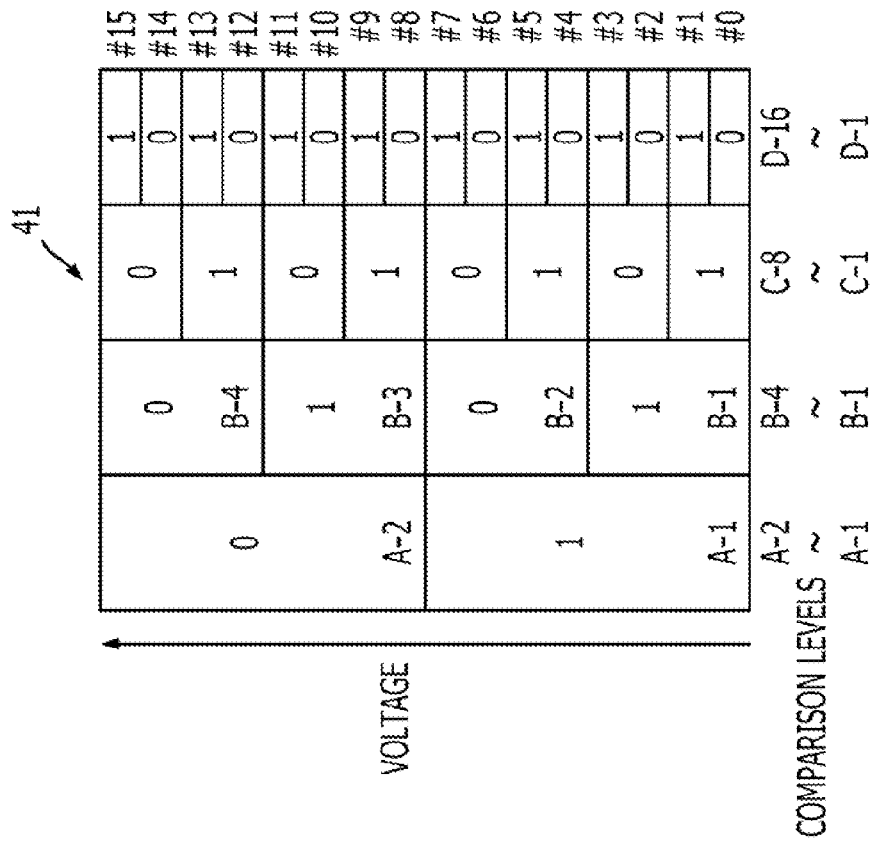

FIG. 11A and FIG. 11B illustrate a successive approximation ADC. Here, the case where the digital value of an output signal is 4 bits will be described as an example. FIG. 11A illustrates the relationship between the analog input voltage and the digital output value of the successive approximation ADC. In a schematic illustration 41 of FIG. 11A, among levels C-1 to C-8, the level C-1 is the lowest, and the following levels C-2, C-3, . . . , C-8 are arranged upwards. Levels D-1 to D-16 are arranged in the same manner as the levels C-1 to C-8. FIG. 11B illustrates an equivalent circuit of the successive approximation ADC.

As illustrated in a circuit diagram 42 of FIG. 11B, in a successive approximation ADC, an analog input voltage applied to the input terminal Vin is held in a sample hold circuit 43. A successive approximation register (SAR) logic circuit 46 sets the value of an N-bit register 45. N is an integer and is 4 in an example illustrated in FIG. 11A and FIG. 11B.

First, the SAR logic circuit 46 sets the most significant bit of the N-bit register 45 to "1" and other bits to "0". An N-bit digital/analog converter (N-bit DAC) 44 converts a digital value set in the N-bit register 45 to an analog voltage. An COMP amplifier 47 compares the output voltage of the N-bit DAC 44 with the output voltage of the sample hold circuit 43. On the basis of the comparison result, the SAR logic circuit 46 determines the most significant bit of the N-bit register 45 as "1" if the output voltage of the sample hold circuit 43 is larger, and determines the most significant bit of the N-bit register 45 as "0" if the output voltage of the sample hold circuit 43 is smaller.

Subsequently, the SAR logic circuit 46 sets the bit next to the most significant bit of the N-bit register 45 to "1" and makes a comparison similarly, thereby determining the value of the bit next to the most significant bit. This processing is repeated until the value of the least significant bit of the N-bit register 45 is determined. For example, in the case where an analog input voltage to the input terminal Vin is at a level of #12 of the schematic illustration 41 on the left, first, it is determined in the first comparison in the COMP amplifier 47 whether the analog input voltage is included in a range A-1 or in a range A-2. Here, it is determined that the analog input voltage is included in the range A-2. Then, it is determined in the second comparison in the COMP amplifier 47 whether the analog input voltage is included in a range B-3 or in a range B-4. Here, it is determined that the analog input voltage is included in the range B-4. Then, it is determined in the third comparison in the COMP amplifier 47 whether the analog input voltage is included in a range C-7 or in a range C-8. Here, it is determined that the analog input voltage is included in the range C-7. Finally, it is determined in the fourth comparison in the COMP amplifier 47 whether the analog input voltage is included in a range D-13 or in a range D-14. Here, it is determined that the analog input voltage is included in the range D-13. In this way, the voltage of an analog electric signal at some instant is converted to a digital electric signal.

In the successive approximation ADC illustrated in FIG. 11A and FIG. 11B, the number of bits is decreased as follows. For example, in the case where the number of bits is decreased from 4 (16 levels) to 3 (8 levels), the analog input voltage to the input terminal Vin, for example, is reduced to half that in the case where the number of bits is 4. The amplitude of an output voltage of the N-bit DAC 44 is set to half that in the case where the number of bits is 4. The amount of shift of the N-bit register 45 is also set to half that in the case where the number of bits is 4. Setting in such a manner allows comparison processing for ranges A-2, B-3, B-4, C-5 to C-8, and D-9 to D-16, for example, to be omitted. In other words, the analog/digital conversion can be achieved with the number of steps half the number of steps in the case where the number of bits is 4. The same applies to the case where the number of bits is decreased from 3 (8 levels) to 2 (4 levels) and the case where the number of bits is decreased from 2 (4 levels) to 1 (2 levels).

Note that, by adjusting the offset of an analog input voltage to the input terminal Vin, comparison processing for the ranges A-1, B-1, B-2, C-1 to C-4, and D-1 to D-8 may be omitted.

Description of Optical Receiving Method

Figure 12:
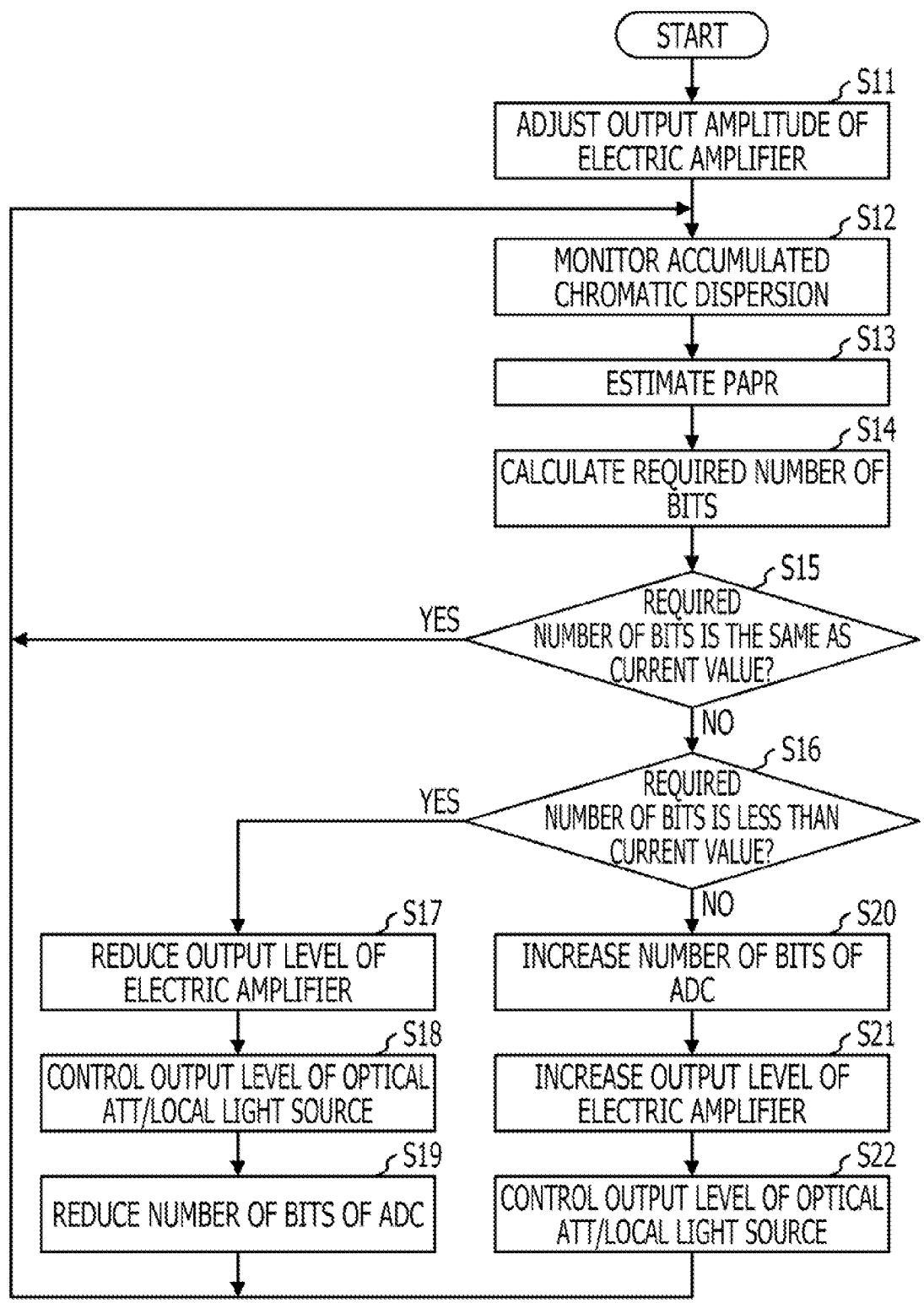
FIG. 12 is a flowchart illustrating an optical receiving method according to a third embodiment.

FIG. 12 is a flowchart illustrating an optical receiving method according to the third embodiment. As illustrated in FIG. 12, when the optical transmission system begins operation and the optical receiver is activated, the optical receiver adjusts, by using the device control circuit 20, output amplitude of the electric amplifier 14 at a constant value such that the level of an analog electric signal after optical/electric conversion is within a specified range of the ADC 15 (S11).

Then, the optical receiver monitors accumulated chromatic dispersion using the chromatic dispersion monitor unit 17 on the basis of information extracted at the time of performing various processing, such as waveform distortion compensation processing, in the DSP 16 (S12). Then, the optical receiver estimates a peak-to-average-power ratio using the PAPR estimation unit 18 (S13). Then, the optical receiver calculates a required number of bits of the ADC 15 using the ADC required-number-of-bits determination unit 19 (S14).

Then, the optical receiver determines using the device control circuit 20 whether the required number of bits of the ADC 15 is the same as the current value (S15). If the required number of bits of the ADC 15 is the same as the current value (S15: Yes), then the process returns to S12 to repeat control operations in and after step S12. On the other hand, if the required number of bits of the ADC 15 is not the same as the current value (S15: No), then the optical receiver determines with the device control circuit 20 whether the required number of bits of the ADC 15 is less than the current value (S16).

Examples of the case where the required number of bits of the ADC 15 is less than the current value include the case where accumulated chromatic dispersion is reduced close to 0 ps/nm. Examples of the case where the required number of bits of the ADC 15 is larger than the current value include the case where accumulated chromatic dispersion is increased from a level close to 0 ps/nm.

If the required number of bits of the ADC 15 is less than the current value (S16: Yes), then the optical receiver reduces, by using the device control circuit 20, the output level of the electric amplifier 14 with a ratio corresponding to the required number of bits of the ADC 15 calculated in S14 (S17). Then, the optical receiver controls, by using the device control circuit 20, the amount of losses, that is, the output level of the optical attenuator 11 and the optical power of local light, that is, the output level of the local light source 22 (S18). Then, the optical receiver reduces the number of bits of the ADC 15 using the device control circuit 20 (S19). Then, the process returns to S12 to repeat the control operations in and after S12.

On the other hand, if the required number of bits of the ADC 15 is not less than the current value (S16: No), then the optical receiver increases the number of bits of the ADC 15 using the device control circuit 20 (S20). Then, the optical receiver increases, by using the device control circuit 20, the output level of the electric amplifier 14 with a ratio corresponding to the required number of bits of the ADC 15 calculated in S14 (S21). Then, the optical receiver controls, by using the device control circuit 20, the output level of the optical attenuator 11 and the output level of the local light source 22 (S22). Then, the process returns to S12 to repeat the control operations in and after S12.

According to the third embodiment, the same effect as in the first embodiment may be obtained.

Fourth Embodiment

Description of Optical Receiver

Figure 13:
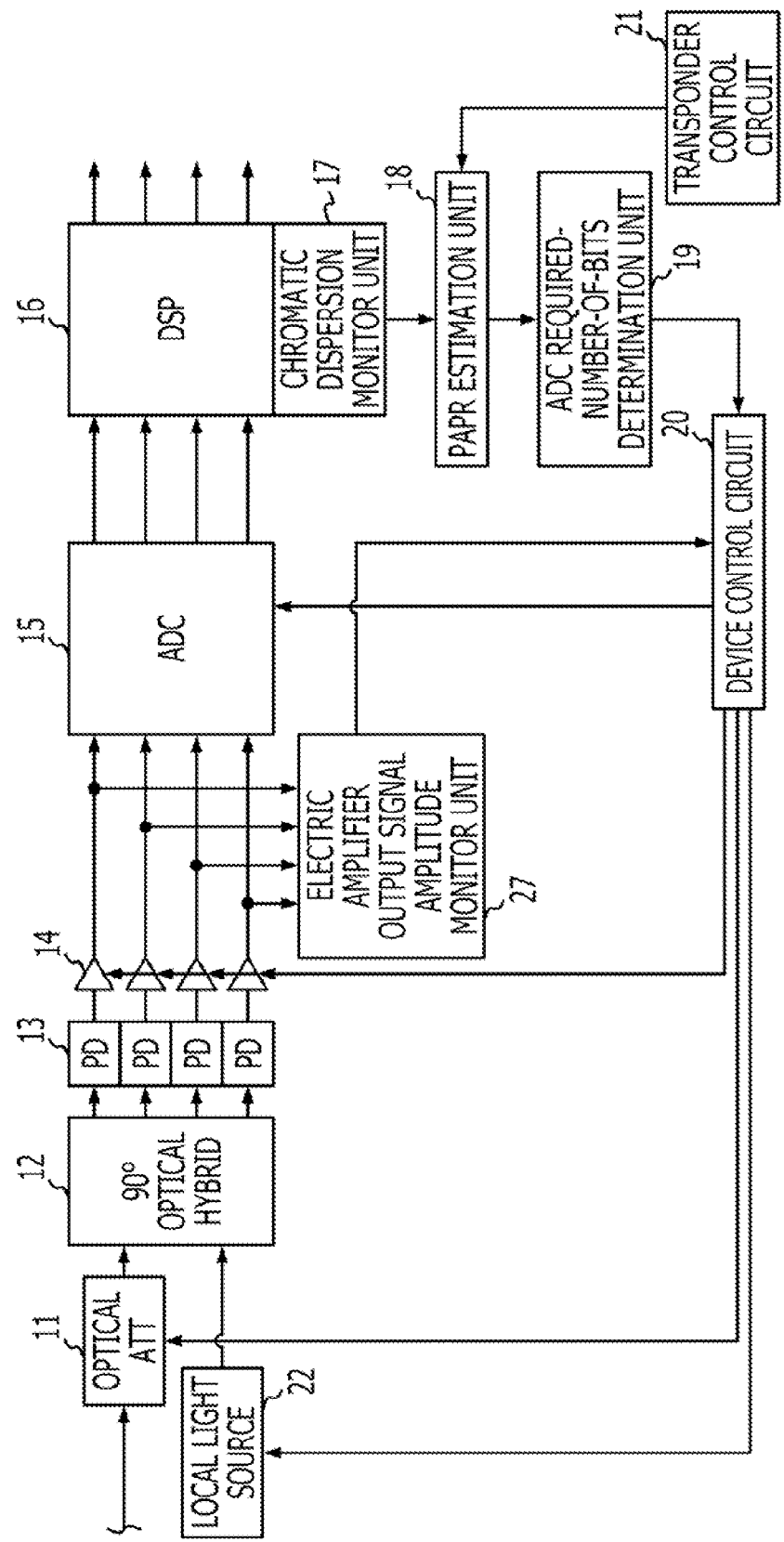
FIG. 13 is a block diagram illustrating an optical receiver according to a fourth embodiment.

FIG. 13 is a block diagram illustrating an optical receiver according to a fourth embodiment. As illustrated in FIG. 13, the optical receiver according to the fourth embodiment includes an electric amplifier output signal amplitude monitor unit 27 in the optical receiver according to the third embodiment. The electric amplifier output signal amplitude monitor unit 27 is connected to an output end of the electric amplifier 14. The electric amplifier output signal amplitude monitor unit 27 monitors the amplitude of an output signal of each electric amplifier 14. The device control circuit 20 may control, by using the electric amplifier output signal amplitude monitor unit 27, the output level of the electric amplifier 14 on the basis of the required number of bits of the ADC 15 and the amplitude monitor value of an output signal from each electric amplifier 14. Other configurations of this embodiment are the same as those of the third embodiment.

Description of Optical Receiving Method

Figure 14:
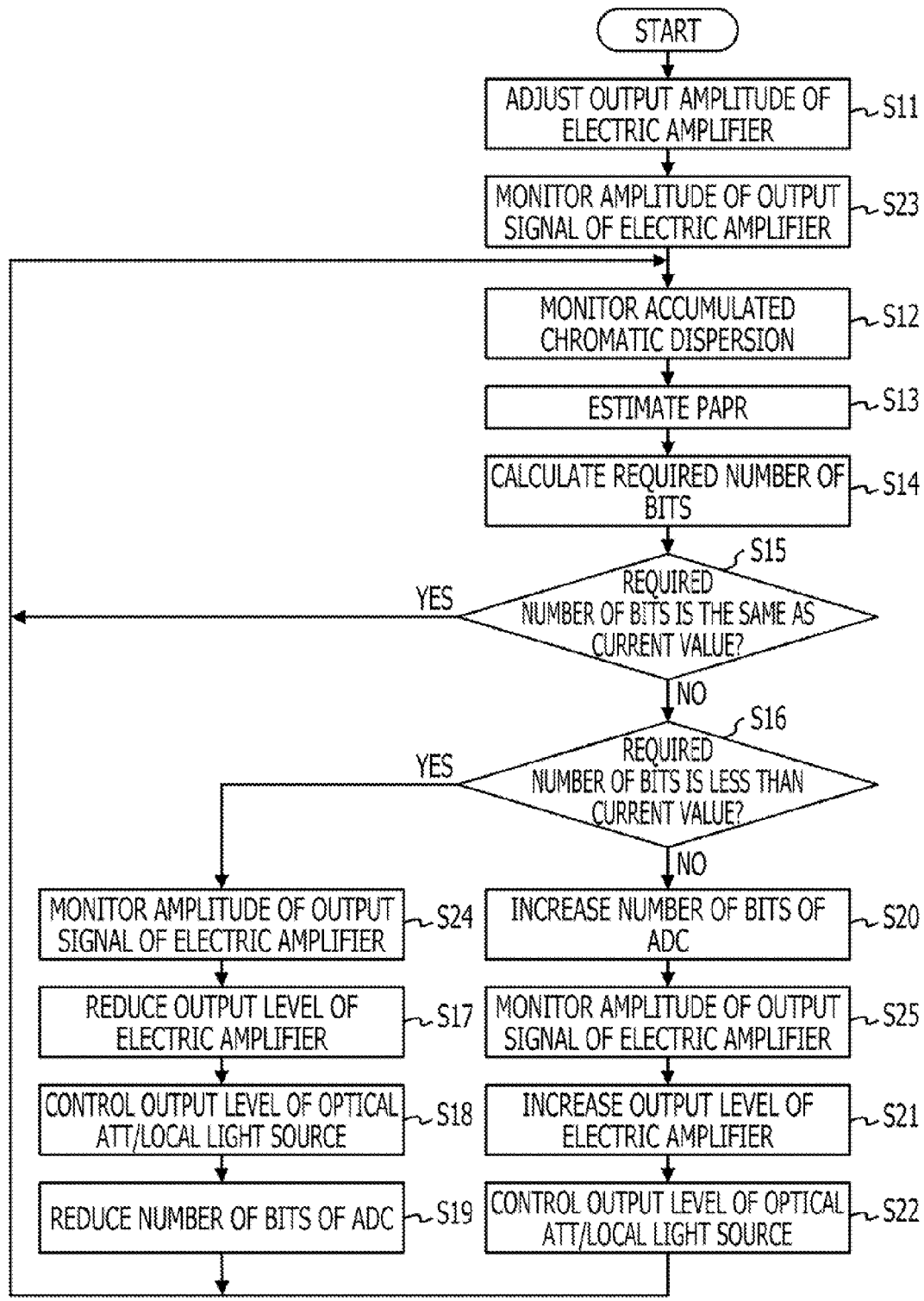
FIG. 14 is a flowchart illustrating an optical receiving method according to the fourth embodiment.

FIG. 14 is a flowchart illustrating an optical receiving method according to the fourth embodiment. As illustrated in FIG. 14, the optical receiving method according to the fourth embodiment differs from the optical receiving method according to the third embodiment in that control operations (S23, S24, and S25) in which the optical receiver monitors the amplitude of an output signal of each electric amplifier 14 using the electric amplifier output signal amplitude monitor unit 27 are inserted between S11 and S12, between S16 and S17, and between S20 and S21, respectively.

Performing S23 after S11 makes it possible to confirm that the output amplitude of each electric amplifier 14 has been adjusted appropriately in S11. Performing S17 after step S24 makes it possible to reduce the output level of the electric amplifier 14 appropriately in accordance with the amplitude of an output signal of each electric amplifier 14 that has been monitored in S24. Performing S21 after S25 makes it possible to increase the output level of the electric amplifier 14 appropriately in accordance with the amplitude of an output signal of each electric amplifier 14 that has been monitored in S25.

Note that S23 may be performed before S11. This way enables the output amplitude of the electric amplifier 14 to be adjusted appropriately in accordance with the amplitude of an output signal of each electric amplifier 14. S17 also may be performed before S24. This way makes it possible to confirm that the output level of each electric amplifier 14 has been reduced appropriately in S17. S21 also may be performed before S25 making it possible to confirm that the output level of each electric amplifier 14 has been increased appropriately in step S21.

According to the fourth embodiment, the same effect as in the first embodiment may be obtained.

Fifth Embodiment

Description of Optical Receiver

Figure 15:
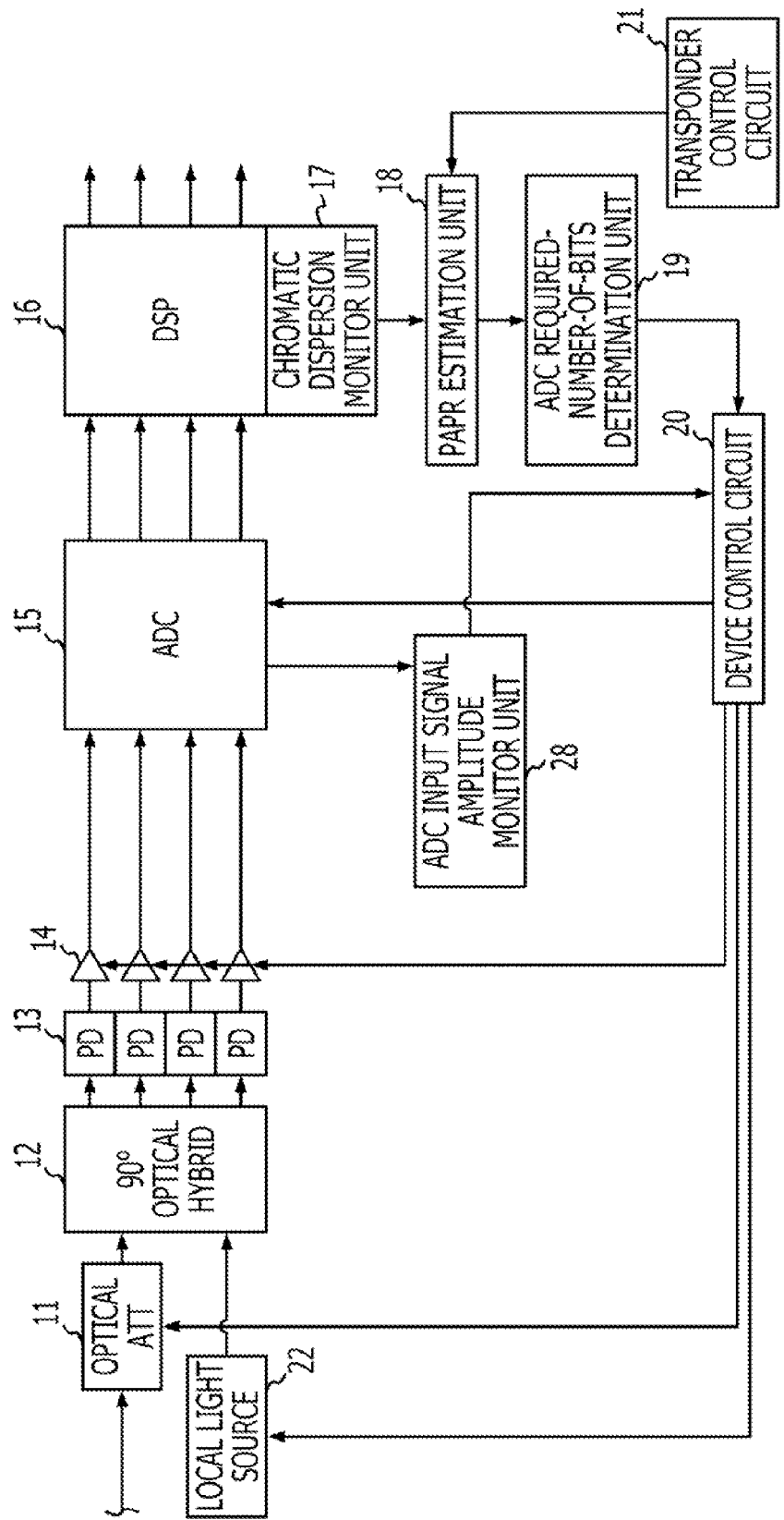
FIG. 15 is a block diagram illustrating an optical receiver according to a fifth embodiment.

FIG. 15 is a block diagram illustrating an optical receiver according to a fifth embodiment. As illustrated in FIG. 15, the optical receiver according to the fifth embodiment includes an ADC input signal amplitude monitor unit 28 in the optical receiver according to the third embodiment. The ADC input signal amplitude monitor unit 28 is connected to an input end of the ADC 15. The ADC input signal amplitude monitor unit 28 monitors the amplitude of an input signal to the ADC 15. The device control circuit 20 may control, by using the ADC input signal amplitude monitor unit 28, the output level of the electric amplifier 14 on the basis of the required number of bits of the ADC 15 and the amplitude monitor value of an input signal to the ADC 15. Other configurations of this embodiment are the same as those of the third embodiment.

Description of Optical Receiving Method

Figure 16:
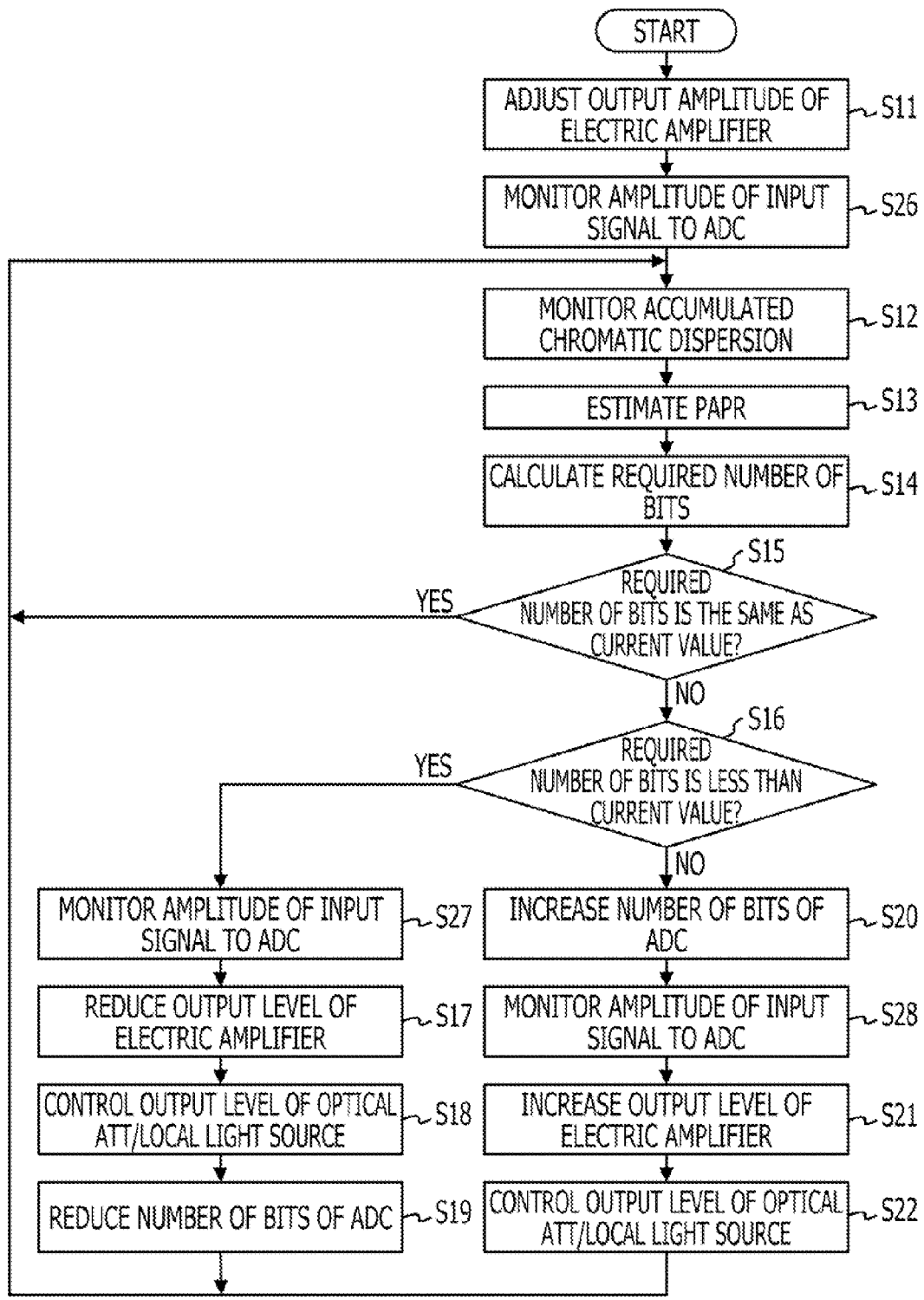
FIG. 16 is a flowchart illustrating an optical receiving method according to the fifth embodiment.

FIG. 16 is a flowchart illustrating an optical receiving method according to the fifth embodiment. As illustrated in FIG. 16, the optical receiving method according to the fifth embodiment differs from the optical receiving method according to the third embodiment in that control operations (S26, S27, and S28) in which the optical receiver monitors the amplitude of an input signal to the ADC 15 using the ADC input signal amplitude monitor unit 28 are inserted between S11 and S12, between S16 and S17, and between S20 and S21, respectively.

Performing S26 after S11 makes it possible to confirm that the output amplitude of each electric amplifier 14 has been adjusted appropriately in S11. Performing S17 after S27 makes it possible to reduce the output level of the electric amplifier 14 appropriately in accordance with the amplitude of an input signal to the ADC 15 that has been monitored in S27. Performing S21 after S28 makes it possible to increase the output level of the electric amplifier 14 appropriately in accordance with the amplitude of an input signal to the ADC 15 that has been monitored in S25.

Note that S26 may be performed before S11 to enable the output amplitude of the electric amplifier 14 to be adjusted appropriately in accordance with the amplitude of an input signal to the ADC 15. S17 also may be performed before S27 to make it possible to confirm that the output level of each electric amplifier 14 has been reduced appropriately in S17. S21 also may be performed before S28 making it possible to confirm that the output level of each electric amplifier 14 has been increased appropriately in S21.

According to the fifth embodiment, the same effect as in the first embodiment may be obtained.

Sixth Embodiment

Description of Optical Receiver

Figure 17:
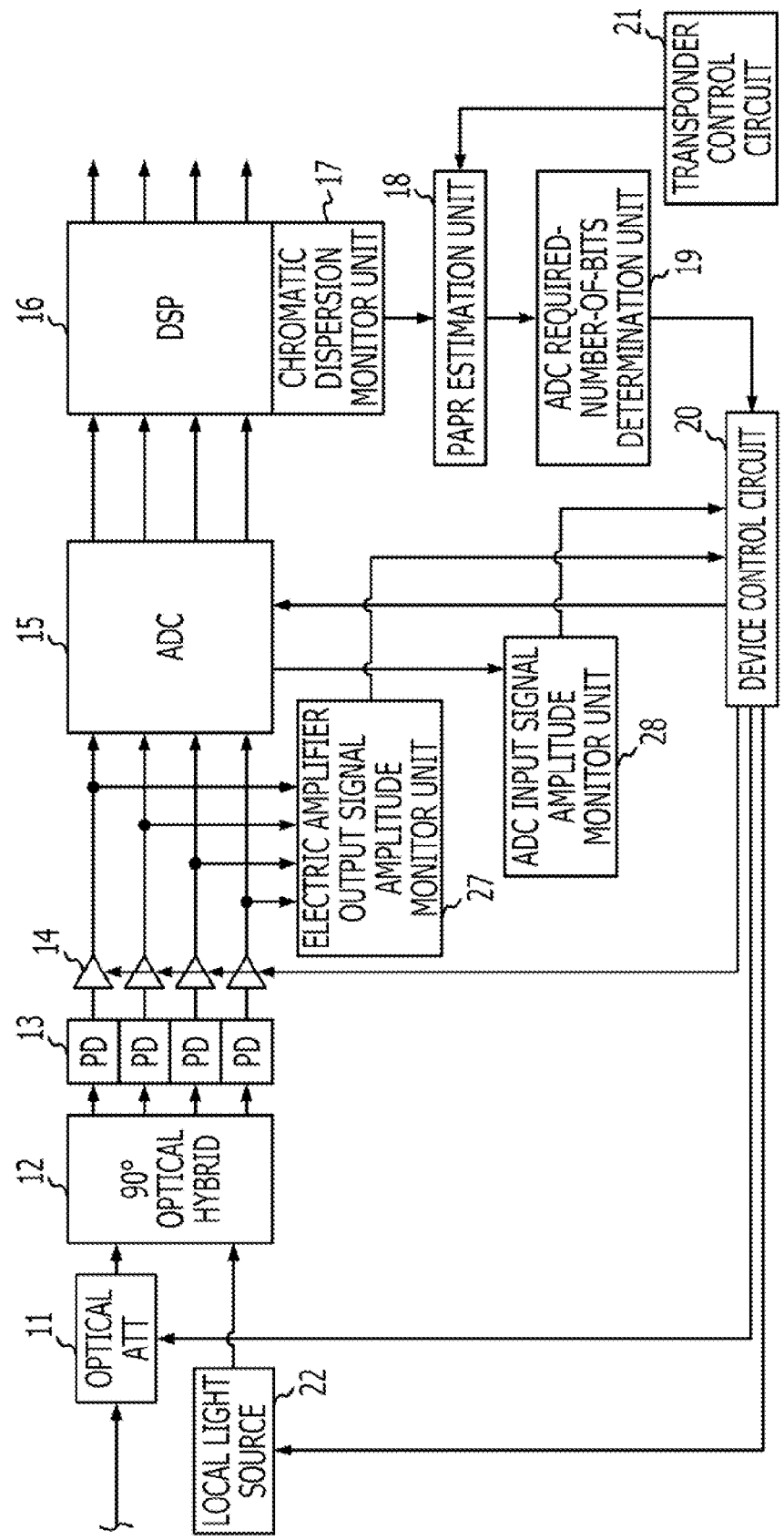
FIG. 17 is a block diagram illustrating an optical receiver according to a sixth embodiment.

FIG. 17 is a block diagram illustrating an optical receiver according to a sixth embodiment. As illustrated in FIG. 17, the optical receiver according to the sixth embodiment includes the electric amplifier output signal amplitude monitor unit 27 and an ADC input signal amplitude monitor unit 28 in the optical receiver according to the third embodiment. That is, the sixth embodiment is a combination of the fourth embodiment and the fifth embodiment.

Description of Optical Receiving Method

Figure 18:
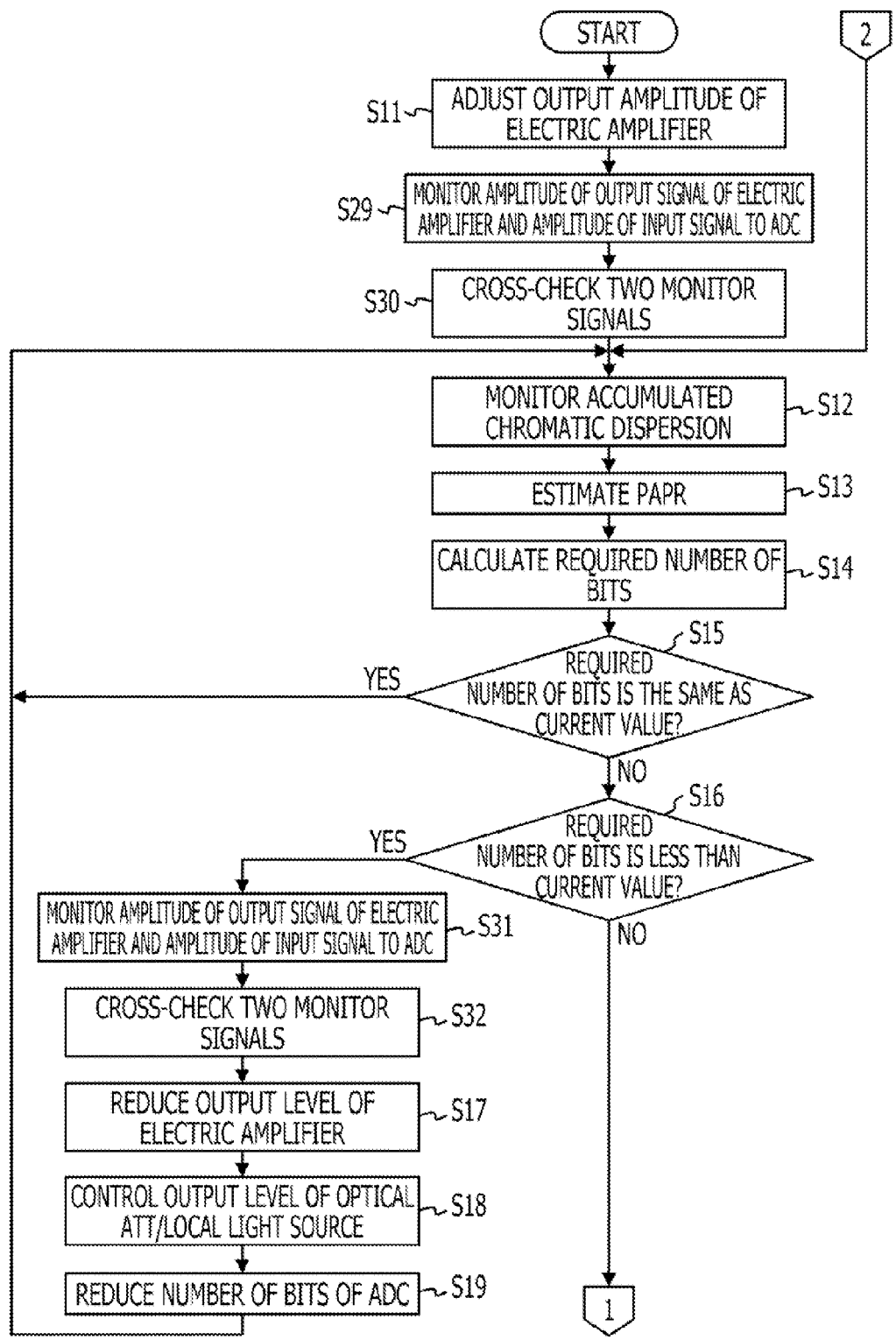
FIG. 18 is a flowchart illustrating an optical receiving method according to the sixth embodiment.
Figure 19:
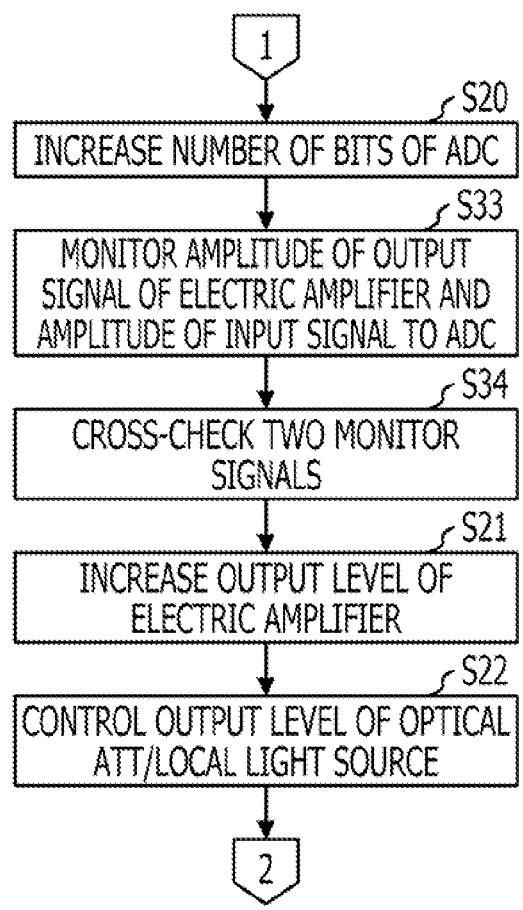
FIG. 19 is a flowchart illustrating the optical receiving method according to the sixth embodiment.

FIG. 18 and FIG. 19 are flowcharts illustrating an optical receiving method according to the sixth embodiment. As illustrated in FIG. 18 and FIG. 19, the optical receiving method according to the sixth embodiment differs from the optical receiving method according to the third embodiment in that the following two control operations are inserted between S11 and S12, between S16 and S17, and between S20 and S21.

In the first one of the inserted control operations, the optical receiver monitors the amplitude of an output signal of each electric amplifier 14 and the amplitude of an input signal to the ADC 15 using the electric amplifier output signal amplitude monitor unit 27 and the ADC input signal amplitude monitor unit 28 (S29, S31, and S33). In the second operation, the optical receiver cross-checks the amplitude monitor value of an output signal of each electric amplifier 14 and the amplitude monitor value of an input signal to the ADC 15 using the device control circuit 20 (S30, S32, and S34).

Performing S29 and S30 after S11 makes it possible to confirm that the output amplitude of each electric amplifier 14 has been adjusted appropriately in step S11. Performing S17 after S31 and S32 makes it possible to reduce the output level of the electric amplifier 14 appropriately in accordance with the amplitude of an output signal of each electric amplifier 14 and the amplitude of an input signal to the ADC 15. Performing S21 after S33 and S34 makes it possible to increase the output level of the electric amplifier 14 appropriately in accordance with the amplitude of an output signal of each electric amplifier 14 and the amplitude of an input signal to the ADC 15.

Note that S29 and S30 may be performed before S11. This way enables the output amplitude of the electric amplifier 14 to be adjusted appropriately in accordance with the amplitude of an output signal of each electric amplifier 14 and the amplitude of an input signal to the ADC 15. S17 also may be performed before S31 and S32. This way makes it possible to confirm that the output level of each electric amplifier 14 has been reduced appropriately in S17. S21 also may be performed before S33 and S34. This way makes it possible to confirm that the output level of each electric amplifier 14 has been increased appropriately in S21.

According to the sixth embodiment, the same effect as in the first embodiment is obtained.

According to this optical receiver and optical receiving method, an advantageous effect that can reduce power consumption may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. An optical receiver comprising:
an analog/digital converter having a dynamic range at a time of converting an analog electric signal generated based on an optical signal to a digital electric signal, the dynamic range being variable; and
a control circuit configured to vary the dynamic range of the analog/digital converter based on chromatic dispersion of the optical signal, wherein
the dynamic range of the analog/digital converter is set with bits such that, in a case where a peak value of chromatic dispersion of a demodulated signal is greater than a threshold, a bit interval in a range of the peak value greater than the threshold is larger than a bit interval in a range of the peak value less than the threshold.

2. The optical receiver according to claim 1, further comprising:
a hybrid circuit configured to mix the optical signal with local light;
an optical/electric converter configured to convert the mixed optical signal to the analog electric signal; and
a digital signal processor configured to demodulate the digital electric signal, wherein
the digital signal processor determines chromatic dispersion of the demodulated signal,
the control circuit varies the dynamic range of the analog/digital converter in accordance with the chromatic dispersion, and
the analog/digital converter converts the analog electric signal to the digital electric signal by using the varied dynamic range.

3. The optical receiver according to claim 2, wherein
the dynamic range of the analog/digital converter is varied in accordance with a relationship between the chromatic dispersion of the demodulated signal and an amplitude of the signal.

4. The optical receiver according to claim 1, wherein
the dynamic range of the analog/digital converter is set with bits at a given interval, the dynamic range being varied by increasing or decreasing a number of the bits.

5. The optical receiver according to claim 1, wherein
the control circuit adjusts a level of an input signal to the analog/digital converter in accordance with a dynamic range of the analog/digital converter.

6. A method for receiving an optical signal comprising:
converting an optical signal to an analog electric signal;
converting the analog electric signal to a digital electric signal;
demodulating the digital electric signal;
monitoring chromatic dispersion of the demodulated signal; and changing a dynamic range of an analog/digital converter at a time of converting the analog electric signal to the digital electric signal in accordance with the chromatic dispersion, wherein the dynamic range of the analog/digital converter is set with bits such that, in a case where a peak value of chromatic dispersion of a demodulated signal is greater than a threshold, a bit interval in a range of the peak value greater than the threshold is larger than a bit interval in a range of the peak value less than the threshold.

7. The method according to claim 6, wherein the dynamic range is set with bits at a given interval, the dynamic range being changed by increasing or decreasing a number of the bits.

8. The method according to claim 6, wherein the dynamic range is changed in accordance with a relationship between the chromatic dispersion and an amplitude of the signal.

9. The method according to claim 6, wherein when the dynamic range is changed, a level of the analog electric signal is adjusted to the dynamic range after change.

\* \* \* \* \*